UNITED STATES PATENT OFFICE 2,540,070

ACYLOXYMETHYLENE-PENTENOATES

Willard J. Croxall, Bryn Athyn, and John O. Van Hook, Philadelphia, Pa., assignors to Rohm & Haas Company, Philadelphia, Pa., a corporation of Delaware No Drawing. Application January 21, 1949, Serial No. 72,075

6 Claims. (Cl. 260—484)

This invention relates to 2-acyloxymethylene-4-pentenoates and to a process for their preparation. These compounds are formed by reacting an ester of a 2-hydroxymethylene-4-pentenoic acid and a non-tertiary monohydric alcohol with an anhydride of a carboxylic acid. Thus, an ester of the formula

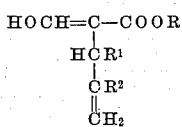

is reacted with a carboxylic anhydride, $$(R''CO)_2O$$

to form the acid, R''COOH, and the compound containing two ester groups,

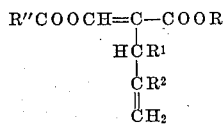

wherein R is a non-tertiary hydrocarbon group, $R^1$ and $R^2$ are members of the class consisting of hydrogen, chlorine, bromine, the phenyl group, and alkyl groups of not over four carbon atoms, and R'' is a hydrocarbon group, particularly an alkyl group of not over three carbon atoms.

These new diesters are useful chemical intermediates, plasticizers, and softeners. They react, for instance, with carbamides and thiocarbamides to form uracils and thiouracils. By hydrolysis they form the free hydroxymethylene-4-pentenoic acids which are decarboxylated by heating to yield terminally unsaturated aldehydes, $$OHCCH_2CH(R^1)C(R^2)=CH_2$$

When heated with an alcohol, R'OH, in the presence of an acidic catalyst, such as p-toluene sulfonic acid, they are converted to ether esters,

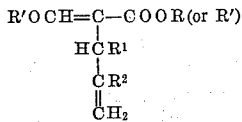

which form the subject of our application Serial No. 72,074, filed on even date.

The preparation of the 2-hydroxymethylene-4-pentenoates, which are here reacted with a carboxylic acid anhydride, forms the subject matter of our application Serial No. 72,076, filed on even date. These starting materials are available through a series of reactions, details of which follow since these reactions are new. As a practical source, they are obtainable through the reaction of acetylene and an ester of carbonic acid in the presence of an alkaline catalyst to form beta-ether acrylates and propionates with the introduction of 2,3-unsaturated groups therein and the rearrangement of these beta-ether acrylates to esters of 2-hydroxymethylene-4-pentenoic acids by heating at 150° to 250° C.

As shown in application Serial No. 52,607, filed by Croxall and Schneider on October 2, 1948, acetylene reacts with an ester of carbonic acid and a non-tertiary alcohol in the presencce of an anhydrous, strongly alkaline catalyst to form beta-ether acrylate and beta,beta-diether propionate. When diallyl carbonate is used, for example, there are obtained allyl beta-alloxyacrylate and allyl beta,beta-dialloxypropionate. Other 2,3-unsaturated residues may be used in the place of the allyl group just shown.

Unsaturated ether esters need not, however, be thus directly prepared. As a starting carbonate there may be taken an ester of a lower saturated aliphatic monohydric alcohol and carbonic acid, such as dimethyl carbonate, diethyl carbonate, dipropyl carbonate, dibutyl carbonate, dihexyl carbonate, or dioctyl carbonate. These yield by reaction with acetylene in the presence of the alkaline catalysts corresponding alkyl beta-alkoxyacrylates and beta,beta-dialkoxypropionates. When these are heated with a 2,3-unsaturated alcohol in the presence of an alkaline catalyst, the groups from the lower boiling alcohols are displaced by a higher boiling unsaturated alcohol, as described in application Serial No. 52,601, filed by Croxall and Van Hook on October 2, 1948.

It is not necessary, however, to replace both ether and ester group. The alkyl group completing the ether function is replaced when a beta-alkoxyacrylate or beta,beta-dialkoxypropionate is heated with a 2,3-unsaturated alcohol in the presence of a mildly acidic catalyst, such as an alkali metal acid sulfate. There is taken from the reaction mixture the alcohol corresponding to the alkyl group. When an amount of such alcohol as is equivalent to the ether group has been removed, the reaction is interrupted. In this way ether esters of the formulae $$R'OCH=CHCOOR$$

and $$(R'O)_2CHCH_2COOR$$

are obtained, as is more fully described in application Serial No. 52,602, filed by Croxall and Van Hook on October 2, 1948. R' is used above to designate the olefinically unsaturated group introduced.

The beta,beta-diether propionates are converted to beta-ether acrylates when the former are heated in the presence of a dealcoholating catalyst, such as an alkali or an alkali metal acid sulfate, and a mole of alcohol is taken off per mole of ester. This process is described in application Serial No. 52,608, filed by Croxall and Schneider on October 2, 1948. By this process a diether ester, such as ethyl diethoxypropionate, is converted to the corresponding acrylate, ethyl beta-ethoxyacrylate, or allyl dialloxypropionate to allyl beta-alloxyacrylate.

In place of the illustrative allyl group which has been the only one thus far given, there may be introduced other allylicly unsaturated group, particularly a hydrocarbon group or a halohydrocarbon group; i. e., a 2,3-unsaturated group. Preferred unsaturated groups are allyl, 2-methallyl, 2-ethallyl, 2-propallyl, 2-butallyl, 2-phenallyl, 2-chloroallyl, 2-bromoallyl, 3-methallyl (crotyl), 3-ethallyl, 3-propallyl, 3-butallyl, and 3-phenallyl (cinnamyl). These are residues of alcohols of the formula $$R^1CH=C(R^2)CH_2OH$$

Such residue is most conveniently and economically introduced through transetherification of an alkyl beta-alkoxyacrylate or an alkyl beta,beta-dialkoxypropionate, accompanied by dealcoholation. Instead of a single pure beta-alkoxyacrylate or beta,beta-dialkoxypropionate, there may be used a mixture of the two, as is frequently obtained from reaction of dialkyl carbonate and acetylene. The alkyl groups are preferably not over eight carbon atoms in size. By this reaction there result compounds of the formula $$R^1CH=C(R^2)CH_2OCH=CHCOOR$$

where R is an alkyl group of not over eight carbon atoms and $R^1$ and $R^2$ have the significance given above. It is desirable that during transetherification the reaction temperature be maintained below 150° C. if the above compounds are to be isolated. The stripping of the alcohol displaced, ROH, is, therefore, advantageously accomplished under reduced pressure.

One may thus start with an ester, $(RO)_2CO$, of carbonic acid and a saturated non-tertiary alcohol, ROH, where R is in particular an alykl group of not over eight carbon atoms and preferably of not over four carbon atoms. By reaction thereof with acetylene at 20° C. to 110° C. in the presence of a strongly alkaline catalyst, such as an alkali metal acetylide, an alkali alcoholate, or a strongly basic quaternary ammonium alkoxide, there are obtained such acrylates as methyl beta-methoxyacrylate, ethyl beta-ethoxyacrylate, propyl beta-propoxyacrylate, butyl beta-butoxyacrylate, hexyl beta-hexoxyacrylate, or octyl beta-octoxyacrylate, or such propionates as methyl beta,beta-dimethoxy-propionate, ethyl beta,beta-diethoxypropionate, butyl beta,beta-dibutoxypropionate, or octyl beta,beta-dioctoxypropionate, or mixtures of ether acrylate and ether propionate. Along with these there may be obtained ether maleates and diether succinates.

When acetylene is no longer absorbed by the reaction mixture, the catalyst is destroyed as with acid, and the reaction mixture separated by distillation. A fraction may be taken off containing both ether acrylate and ether propionate. This mixture may be used directly in subsequent steps or separated or the propionate decomposed to ether acrylate.

The ether acrylate or the mixture may then be transetherified by heating it with a beta,gamma-unsaturated alcohol, such as allyl, 2-chloroallyl, 2-bromoallyl, 2-methallyl, 2-butallyl, crotyl, cinnamyl alcohols, or 2-penten-1-ol, 2-hexen-1-ol, or the like. A mildly acidic catalyst is used at a concentration of 0.01% to 1% of the weight of the ether ester. The alcohol ROH is displaced at temperatures between 75° C. and 150° C. at normal or reduced pressure. This permits isolation of the ether ester $$R'OCH=CHCOOR \text{ (or R')}$$

where R' is the unsaturated group introduced.

The product is then heated at 150° C. to 250° C., preferably 150° C. to 200° C., and is thereby rearranged. The ester of 2-hydroxymethylene-4-pentenoic acid which results is separated.

Alternatively, the alkyl beta-alkoxyacrylate or dialkoxy propionate is heated at 150° C. to 250° C. in the presence of an alkali metal acid sulfate with a beta,gamma-unsaturated alcohol, R'OH, where R' is the beta,gamma-unsaturated residue. Transetherification and rearrangement both take place in the reaction mixture. The displaced alcohol is distilled off, the catalyst is destroyed, and the rearranged product is worked up.

Similarly, an alkyl beta-alkoxyacrylate is heated to 150° C. to 250° C. with a beta,gamma-unsaturated alcohol in the presence of an alkaline catalyst. Transetherification and transesterification now both take place accompanied by rearrangement of the unsaturated group introduced through the ether function. Under these conditions there can be isolated not only some transetherified and transesterified acrylates but also 2-hydroxymethylene-4-pentenoates and/or on continued heating 4-pentenoates. The last result from the decarbonylation of the 2-hydroxymethylene-4-pentenoates through heating in the presence of alkali.

EXAMPLE A (a) *Preparation of ethyl beta-alloxyacrylate*

A mixture of 144 grams of ethyl beta-ethoxyacrylate, 174 grams of allyl alcohol, and 0.1 gram of sodium hydrogen sulfate was heated in a reaction vessel carrying a distillation column. After a short period of heating there was evolved ethyl alcohol which was taken off at an overhead temperature of 78°–79° C. with a pot temperature of about 100° C. The pot temperature gradually rose to 120° C. while there were taken off 41 grams of ethyl alcohol and then 21 grams of a mixture of ethyl alcohol and allyl alcohol, the latter distilling at 80° to 94° C. The reaction mixture was then subjected to distillation under reduced pressure. A fraction distilling at 25° to 40° C./22 mm. was identified as allyl alcohol. Between 51° and 68° C./3 mm. a mixture of allyl alcohol and ethyl beta-alloxyacrylate was taken off. Then, the main fraction of ethyl beta-alloxyacrylate was distilled at 65°–72° C./2–3 mm. It had a refractive index, $n_D^{20}$, of 1.4635. The next fraction distilled at 69°–77° C./2 mm., had a refractive index of 1.4724, and consisted of a mixture of ethyl beta-alloxyacrylate and allyl beta-alloxyacrylate.

The main fraction was redistilled at 73° C./3 mm. The product thus obtained had a refractive index of 1.4640 and a saponification equivalent of 157. The theoretical saponification equivalent for ethyl beta-alloxyacrylate is 156.

(b) *Rearrangement of ethyl beta-alloxyacrylate to ethyl 2-hydroxymethylene-4-pentenoate*

Pure ethyl beta-alloxyacrylate, prepared as described immediately above, was taken in an amount of 312 grams. Thereto was added 5 grams of beta-naphthol and the mixture was heated at 150° C. (±5° C.) for two hours with stirring. This mixture was then cooled to 10° C. and stirred at 10° C. for one-half hour with a solution of 80 grams of sodium hydroxide in 500 ml. of water. The resulting mixture was then allowed to stand. Two layers formed and were separated. The lower aqueous layer was shaken with ether and the ether extract was added to the organic layer. The latter was then dried over potassium carbonate and distilled. Therefrom was recovered 43 grams of ethyl beta-alloxyacrylate, distilling at 60°–70° C./0.7 mm.

To the aqueous layer there was added hydrochloric acid until the layer was distinctly acidic. An organic layer formed and was separated after it had been taken up in ether. The ether solution was dried over a calcium sulfate drying agent and subjected to distillation. After the ether had been stripped off, a fraction was obtained at 63°–76° C./2.5 mm. which corresponded approximately in composition to ethyl 2-hydroxymethylene-4-pentenoate. This fraction was redistilled and the fraction coming over at 46°–47° C./1 mm. was collected. It had a refractive index, $n_D^{20}$, of 1.4565 and a density, $$d_{20}^{20}$$

of 1.040. It contained by analysis 61.83% of carbon and 7.85% of hydrogen, compared to theoretical values for ethyl 2-hydroxymethylene-4-pentenoate of 61.51% and 7.74% respectively.

There may similarly be prepared methyl beta-alloxyacrylate, propyl beta-chloroalloxyacrylate, butyl beta-chloroalloxyacrylate, or other alkyl beta-alloxyacrylate, which may in turn be rearranged by heating to an alkyl 2-hydroxymethylene-4-pentenoate, as above. Typical of these is the following preparation.

EXAMPLE B (a) *Preparation of methyl beta-alloxyacrylate*

A mixture of 116 grams of methyl beta-methoxyacrylate, 108 grams of allyl alcohol, and 0.1 gram of sodium hydrogen sulfate was heated in a reaction vessel carrying a packed distillation column. When the reaction mixture reached a temperature of about 80° C., methyl alcohol began to be evolved. It was taken off at overhead temperatures of 64° to 67° C., while the pot temperature was carried above 100° C. The reaction mixture was then subjected to distillation through a two-foot column under reduced pressure. Excess allyl alcohol was taken off. There was then obtained a fraction of 56 grams, distilling at 57°–63° C./2-4 mm. This fraction had a refractive index, $n_D^{20}$, of 1.4675, molecular refraction, $MR_D$, of 37.43, a density, $$d_{20}^{20}$$

of 1.054, and a saponification equivalent of 145. Theoretical values for methyl beta-alloxyacrylate ($C_7H_{10}O_3$) are for $MR_D$, 36.89, and for saponification equivalent, 142.

Continued distillation yielded 60 grams of a mixture of methyl beta-alloxyacrylate and allyl beta-alloxyacrylate distilling at 68°–85° C./3-2 mm.

(b) *Rearrangement of methyl beta-alloxyacrylate to methyl 2-hydroxymethylene-4-pentenoate*

A portion of the above methyl beta-alloxyacrylate was heated at 150° C. for three and one-half hours. The reaction mixture was then distilled and four grams of an oil obtained at 40°–45° C./2-3 mm. which corresponded approximately in composition to methyl 2-hydroxymethylene-4-pentenoate.

In the following example there is used crotyl alcohol as typical of the 2,3-unsaturated alcohols, $R^1CH=C(R^2)CH_2OH$ wherein $R^1$ is a hydrocarbon group and $R^2$ is hydrogen. As will be seen, the $R^1$ group appears in the pentenoate in the 3-position thereof. In this particular case $R^1$ will be methyl, but the same reaction is obtained when $R^1$ is ethyl, propyl, or butyl, or phenyl, in each case the $R^1$ hydrocarbon group appearing in the rearranged ester in the 3-position.

The following example illustrates another phase of the reactions here-involved, the use of diether propionates as starting materials and their conversion to ether acrylates as part of the course of the chemical changes leading to the 2-hydroxy-methylene-4-pentenoates.

EXAMPLE C (a) *Preparation of ethyl beta-crotoxyacrylate*

A mixture of 158 grams of ethyl beta,beta-diethoxypropionate, 60 gram of crotyl alcohol, and 200 ml. of toluene was treated with 0.1 gram of sodium acid sulfate and heated in a reaction vessel carrying a two and a half foot column. There were obtained 100 grams of an ethanol-toluene azeotrope which distilled at 74°–78° C. and a fraction of 30 grams of ethanol and toluene which distilled at 78° to 105° C. The amount of ethanol taken off was 85 grams (theory for displacement of the ethoxy groups is 75 grams). Distillation was continued under reduced pressure. At 35°–40° C./40 mm. a fraction consisting of toluene was taken off. Between 50° and 71° C./1 mm. there were obtained 55 grams of a mixture of toluene, ethyl beta-ethoxyacrylate, and ethyl beta-crotoxyacrylate. There was then obtained at 71° C./0.9 mm. a fraction of 56 grams of ethyl beta-crotoxyacrylate. It had a refractive index, $n_D^{20}$, of 1.4619 and a saponification equivalent of 172. It contained by analysis 63.75% of carbon and 8.45% of hydrogen. Theoretical values for ethyl beta-crotoxyacrylate are 63.51% for carbon content, 8.28% for hydrogen content, and 170 for saponification equivalent.

After the above fraction was obtained, there was distilled at 71°–94° C./0.9 mm. a fraction which was found to be a mixture of ethyl beta-crotoxyacrylate and crotyl beta-crotoxyacrylate.

(b) *Rearrangement to ethyl 2-hydroxymethylene 3-methyl-4-pentenoate*

A portion of 80 grams of ethyl beta-crotoxyacrylate was placed in a flask and heated for 40 minutes at 168–170° C. The contents of the flask were cooled to 10° C. and stirred at 10° C. for 15 minutes with a solution of 30 grams of sodium hydroxide in 270 grams of water. The resulting mixture appeared homogeneous. It was extracted with two 50 ml. portions of ethyl ether. Evaporation of the ether extracts left no residue. The aqueous layer was acidified with dilute hydrochloric acid and an organic layer formed. It was taken up in ether and separated. The water layer was extracted several times with small portions of ether, which were combined with the main organic portion. The combined ether extracts were dried over calcium sulfate and distilled. After removal of ether there was obtained a main fraction which distilled at 40°–75° C./1 mm. This fraction was redistilled at 60°–68° C./1 mm. The product had a refractive index, $n_D^{20}$, of 1.4490. It had by analysis a carbon content of 63.47% and a hydrogen content of 8.31% corresponding to ethyl 2-hydroxymethylene 3-methyl-4-pentenoate, for which the theoretical carbon content is 63.51% and hydrogen content is 8.28%.

The following example demonstrates the use of a relatively large group and of a phenyl group as $R^1$ in the unsaturated alcohol.

EXAMPLE D (a) There was heated in a reaction vessel equipped with a distilling column two feet high a mixture of 144 grams of ethyl beta-ethoxyacrylate, 140 grams of cinnamyl alcohol, 100 ml. of toluene, and 0.1 gram of sodium hydrogen sulfate. There was taken off at 74°–78° C. an azeotrope of ethanol and toluene in an amount of 53 grams. Between 78° and 110° C. there was taken off a mixture of 7 grams of ethanol and toluene. The pot temperature was then raised to 205° C. to strip off the rest of the toluene. Distillation was continued under reduced pressure. Between 55° C. and 126° C./1 mm. there was obtained cinnamyl alcohol, ethyl beta-ethoxyacrylate, and ethyl beta-cinnamoxyacrylate totalling 67 grams. There was then obtained a fraction distilling at 126°–175° C./1 mm. which consisted of ethyl beta-cinnamoxyacrylate (86%) and ethyl 2-hydroxymethylene-3-phenyl-4-pentenoate (14%), as determined by titration.

The residue was distilled from a von Braun flask and at 180°–220° C./1 mm. a fraction was obtained which consisted of cinnamyl beta-cinnamoxyacrylate (88%) and cinnamyl 2-hydroxymethylene-3-phenyl-4-pentenoate (12%).

(b) When these fractions were heated at 170°–200° C., they steadily increased in acidity as the beta-ether acrylate was rearranged to the 2-hydroxymethylene 3-phenyl-4-pentenoates in each case. The final products were ethyl 2-hydroxymethylene-3-phenyl-4-pentenoate and cinnamyl 2-hydroxymethylene-3-phenyl-4-pentenoate respectively.

In the next two examples the use of a 2-substituent in the 2,3-unsaturated alcohol is shown. This substituent may be a halogen, such as chlorine or bromine, or a hydrocarbon group, such as an alkyl group of a phenyl group.

EXAMPLE E (a) *Preparation of ethyl beta-chloroalloxyacrylate*

A mixture of 190 grams of ethyl beta,beta-diethoxypropionate, 139 grams of beta-chloroallyl alcohol, $CH_2=CClCH_2OH$, 300 ml. of toluene, and two grams of sodium hydrogen sulfate was heated in a reaction vessel equipped with a column one foot in height. There was taken off at overhead temperatures of 76°–80° C. an azeotrope of ethanol and toluene, containing 78 grams of ethanol. The mixture was then subjected to distillation at reduced pressure. A fraction of 273 ml. of toluene was distilled at 40° C./40 mm. and then a fraction of 35 grams of chloroallyl alcohol was taken off at 50°–62° C./2 mm. The next fraction, distilled at 45°–80° C./1 mm., was found to consist of ethyl beta-ethoxyacrylate and ethyl beta-chloroalloxyacrylate. There was distilled at 80°–87° C./1 mm. a fraction of 86 grams of ethyl beta-(beta'-chloroalloxy)acrylate. It had a refractive index, $n_D^{20}$, of 1.4800 and contained according to analysis 50.12% of carbon, 5.99% of hydrogen, and 18.65% of chlorine. The theoretical values for ethyl beta-(beta'-chloroalloxy)-acrylate are 50.39%, 5.82%, and 18.62% respectively.

A final fraction of 35 grams was distilled at 87°–117° C./1 mm. It was a mixture of ethyl beta-chloroalloxyacrylate and chloroallyl beta-chloroalloxyacrylate.

(b) *Rearrangement of ethyl beta-chloroalloxyacrylate*

A portion of 40 grams of ethyl beta-(beta'-chloroalloxy)acrylate was heated at 150°–190° C. for ten minutes and then subjected to distillation under reduced pressure. A fraction of 25 grams was taken off at 45°–160° C./1 mm. This was extracted with 100 ml. of a 10% sodium hydroxide solution and then with 100 ml. of a 5% sodium hydroxide solution. The organic liquid which was separated was unconverted ethyl beta-(beta'-chloroalloxy)acrylate in an amount of 12 grams. The aqueous layer was rendered acidic with hydrochloric acid solution and extracted with ethyl ether. The extracts were dried over a calcium sulfate drying reagent and distilled. After removal of ether there was obtained a fraction of five grams of ethyl 2-hydroxymethylene-4-chloro-4-pentenoate, which distilled at 60°–90° C./1 mm. and had a refractive index, $n_D^{20}$, of 1.4798.

The above procedures were followed in transetherifying butyl beta,beta-dibutoxypropionate with beta-chloroallyl alcohol to yield butyl beta-(beta'-chloroalloxy)acrylate, which was in turn heated at about 190° C. to cause rearrangement. The final product was butyl 2-hydroxymethylene-4-chloro-4-pentenoate distilling at 80°–100° C./1 mm.

EXAMPLE F

*Preparation of methallyl 4-methyl-4-pentenoate and methallyl 2-hydroxymethylene-4-methyl-4-pentenoate*

A mixture of 144 grams of ethyl beta-ethoxyacrylate, 170 grams of methallyl alcohol in which 5 grams of sodium had been dissolved, and 200 grams of toluene was heated in a reaction vessel equipped with a two-foot packed column. There was taken off an ethanol-toluene azeotrope (140 grams) at overhead temperatures of 76° to 85° C. with the pot temperature reaching 125° C. The reaction mixture was cooled and poured into water. The mixture was rendered acidic and the organic layer separated, washed with brine, dried, and distilled. After toluene had been removed, the remaining liquid was heated at 70° to 170° C. and distilled with overhead temperatures of 40° to 140° C./1 mm. to give a fraction of 134 grams. This fraction was washed with 200 ml. of a cold aqueous solution containing 10% of sodium hydroxide. The aqueous and organic layers were separated, the organic layer dried over anhydrous potassium carbonate and distilled under reduced pressure. A fraction of 12 grams was obtained at 32°–40° C./1 mm. It had a refractive index of 1.4444 and corresponded in composition to methallyl 4-methyl-4-pentenoate.

This fraction was redistilled at 80° C./9 mm. It then had a refractive index of 1.4438, a density, $$d_{20}^{20}$$

of 0.9103, a molecular refraction, MR$_D$, of 49.08 and a saponification equivalent of 169. Theoretical values are 49.10 for molecular refraction and 167 for saponification equivalent.

There was also obtained 42 grams of methallyl beta-methalloxyacrylate, which distilled at 40°–85° C./1 mm. and had a refractive index, $n_D^{20}$, of 1.4714. There was further obtained a fraction of 29 grams, distilling at 85°–90° C./1 mm. which was identified as methallyl beta,beta-di-(methalloxy)propionate.

The aqueous layer from the sodium hydroxide wash was rendered acidic with dilute hydrochloric acid and extracted with ethyl ether several times. The extracts were combined, dried, and distilled. After the ether had been taken off, the product (10 grams) distilled at 64°–66° C./1 mm. It was identified as methallyl 2-hydroxymethylene-4-methyl-4-pentenoate.

EXAMPLE G

*(a) Preparation of allyl beta-alloxyacrylate and beta,beta-di(alloxy) propionate*

A mixture of 95 grams of ethyl beta,beta-diethoxypropionate, 200 ml. of toluene, and 63 grams of allyl alcohol in which there had been dissolved 1.5 grams of metallic sodium was heated in a reaction vessel equipped with a two-foot column. There were taken off 90 grams of a toluene-ethanol azeotrope at 78°–80° C. and 30 grams of a toluene-allyl alcohol mixture at 80°–92° C. The pot temperature reached 120° C. The reaction mixture was cooled to room temperature and poured into water. The resulting mixture was neutralized with acid. The organic layer was taken up with ethyl ether to assist in its separation and the aqueous layer extracted with ether. The organic layer and ether extract were combined, dried, and distilled. After the ether had been removed, there were obtained between 88° and 115° C. at 1.0 mm. with pot temperatures of 110° to 135° C. 37 grams of a mixture of allyl beta-alloxyacrylate and allyl beta,-beta-dialloxypropionate.

These products are also obtainable by the direct reaction of diallyl carbonate and acetylene. For example, 213 grams of allyl alcohol was treated with five grams of sodium in small pieces. When the sodium had all dissolved, excess allyl alcohol was distilled off under reduced pressure. Thereto was added 246 grams of diallyl carbonate. The apparatus was flushed with nitrogen and the batch was maintained at 80°–85° C. while acetylene was pressed in at 10 inches mercury pressure. When acetylene was no longer taken up, the batch was cooled, rendered acid by addition of acetic acid (23%) solution. An oil layer formed and was separated. It was fractionally distilled under reduced pressure. At 103°–120° C./4 mm. a mixture of allyl beta-alloxyacrylate and allyl beta,-beta-dialloxypropionate was obtained. Careful refractionation gave a separation of these products.

*(b) Rearrangement reaction of allyl beta-alloxyacrylate and beta,beta-dialloxy propionate as obtained above*

The mixture was taken up in 100 ml. of toluene and 0.05 gram of sodium acid sulfate added thereto. The mixture was then heated under reflux for an hour and then distilled. Toluene and allyl alcohol were taken off. There was then obtained by distillation 20 grams of product which consisted of 60% of allyl 2-hydroxymethylene-4-pentenoate and 40% of allyl beta-alloxyacrylate, as determined by analysis.

EXAMPLE H

*Preparation of allyl 2-hydroxymethylene-4-pentenoate*

There were mixed 432 grams of ethyl beta-ethoxyacrylate and 360 grams of allyl alcohol in a reaction vessel equipped with a 3.5-foot column which was connected to a wet test gas meter. The mixture was heated to reflux and a solution of sodium ethoxide formed by dissolving five grams of sodium in 67 grams of ethanol was introduced in small increments. Ethanol and allyl alcohol were distilled from the mixture and the temperature of the liquid in the reaction vessel was carried up to 172° C. There were taken off 18.9 liters of carbon monoxide. The liquid was then distilled under reduced pressure. A distillate of 326 grams was obtained at 50°–123° C./1 mm. A tarry residue of 148 grams remained. The distillate was fractionated through a packed column. At 36°–74° C./40 mm. a fraction of 46 grams was obtained. It had a refractive index, $n_D^{20}$, of 1.4140 and corresponded by composition to ethyl 4-pentenoate. A 165-gram fraction distilled at 69°–73° C./20 mm., had a refractive index of 1.4350, and proved to be allyl 4-pentenoate. There was obtained at 62° C./5 mm. to 85° C./1 mm. 69 grams of a mixture of allyl 4-pentenoate and allyl 2-hydroxymethylene-4-pentenoate.

From the esters of 2-hydroxymethylene-4-pentenoic acid the acylated derivatives are formed by reaction with a carboxylic acid anhydride. While this reaction is a general one for anhydrides of both monocarboxylic acids and polycarboxylic acids, the preferred anhydrides are those from monobasic carboxylic acids of not over four carbon atoms, acetic, propionic, butyric, and isobutyric.

The reaction is effected by mixing an ester of 2-hydroxymethylene-4-pentenoic acid and an anhydride. With the more reactive anhydrides, the mixing is done gradually and, when at least an equivalent has been added, the reaction mixture is heated to ensure completion of the reaction. The carboxylic acid formed is a byproduct and any excess of unreacted anhydride is removed, usually by distillation. The 2-acyloxymethylene-4-pentenoate is then worked up.

The reaction yields compounds of the formula $$R''COOCH=C-COOR(\text{or } R')$$
$$|$$
$$HCR^1$$
$$|$$
$$CR^2$$
$$\|$$
$$CH_2$$

where R'' is preferably an alkyl group of not over three carbon atoms. R, R', R$^1$, and R$^2$ have meanings given above.

Specific examples illustrating the above procedure follow.

EXAMPLE 1

A mixture of 157 grams of ethyl 2-hydroxymethylene-4-pentenoate and 220 grams of acetic anhydride was formed and heated in a reaction vessel equipped with a distilling column. Acetic acid was taken off at 110° C. to 125° C., whereupon a mixture of acetic acid and acetic anhydride was obtained. The reaction mixture was then distilled under reduced pressure. After acetic anhydride had been taken off, there was obtained at 75° C./1 mm. 115 grams of ethyl 2-acetoxymethylene-4-pentenoate, having a refractive index of 1.4601 and distilling at 100°–105° C./2 mm.

EXAMPLE 2

The procedure of Example 1 was followed with a mixture of ethyl 2-hydroxymethylene-4-pentenoate and propionic anhydride. There was obtained at 90°–95° C./0.5 mm. ethyl 2-propionoxymethylene-4-pentenoate.

EXAMPLE 3

The same procedure was applied to a mixture of ethyl 2-hydroxymethylene-4-pentenoate and butyric anhydride. There was obtained at 100°–105° C./0.5 mm. ethyl 2-butyroxymethylene-4-pentenoate.

In place of ethyl 2-hydroxymethylene-4-pentenoate there may be used the methyl, propyl, butyl, hexyl, octyl, or an allyl ester. The same sort of reaction occurs with acetic anhydride yielding alkyl 2-acetoxymethylene-4-pentenoates. With butyric anhydride the alkyl (or allyl) 2-butyroxymethylene-4-pentenoates result.

Instead of the alkyl 2-hydroxymethylene-4-pentenoates used above there may be used the 2-hydroxymethylene-4-pentenoates which have $R^1$ or $R^2$ substituents in the 4- or 3-positions. As established above, these groups include methyl, ethyl, propyl, butyl, and phenyl groups and chlorine and bromine.

EXAMPLE 4

By the procedures of examples directly above there was reacted at 100° to 150° C. 40 grams of acetic anhydride and 25 grams of ethyl 2-hydroxymethylene-3-methyl-4-pentenoate. After acetic acid and acetic anhydride had been stripped off, there was obtained a fraction at 100°–110° C./0.5–1 mm. which corresponded in composition to ethyl 2-acetoxymethylene-3-methyl-4-pentenoate, having a saponification equivalent of 525.

The same reaction applied to ethyl 2-hydroxymethylene-4-methyl-4-pentenoate leads in the same way to ethyl 2-acetoxy-4-methyl-4-pentenoate.

EXAMPLE 5

By the procedures just described there was heated together 40 grams of acetic anhydride and 20 grams of ethyl 2-hydroxymethylene-3-phenyl-4-pentenoate. After acetic acid had been removed and acetic acid and acetic anhydride stripped therefrom at temperatures up to 145° C., there was obtained at 100°–115° C./0.6–8 mm. a small fraction having a saponification equivalent of 410 and corresponding to ethyl 2-acetoxymethylene-3-phenyl-4-pentenoate.

As an alternative approach to the acylated product, there may be heated together a carboxylic acid anhydride and an ester of a beta-alloxyacrylic acid. There occurs in separate steps the rearrangement shown above and the acylation without isolation of intermediates. Temperatures of 150° to 200° C. are sufficient to accomplish this result. This method is illustrated in the following examples.

EXAMPLE 6

A mixture of 197 grams of ethyl beta-alloxyacrylate and 255 grams of acetic anhydride (90% pure) was heated to 150° C. in a flask equipped with a four-foot packed column. There was taken off a forerun at 60° to 115° C. At 118°–125° C. there were obtained 76 grams of acetic acid while the pot temperature advanced to 170° C. The pressure within the apparatus was then reduced and excess acetic anhydride taken off. The remaining material was fractionally distilled at low pressure. After a small forerun a fraction of 170 grams was obtained at 102°–108° C./2–3 mm. It had a refractive index of 1.4600, a molecular refraction of 51.41 and a density of 1.056. It had a saponification number of 563 and an acid number of 284. Its carbon content was 59.86% and its hydrogen content was 7.33%. The product was thus ethyl 2-acetoxymethylene-4-pentenoate, for which corresponding theoretical values are saponification equivalent—568, acid number—284, molecular refraction—50.76, carbon content—60.59%, and hydrogen content—7.12%.

EXAMPLE 7

Ethyl 2-propionoxymethylene-4-pentenoate

A mixture of 156 grams (1.0 mole) of ethyl beta-alloxyacrylate and 195 grams (1.5 moles) of propionic anhydride was heated in a Claisen flask at 172°–175° C. while 79 grams (1.07 moles) of propionic acid was distilled off at 133°–140° C. This had a refractive index, $n_D^{20}$, of 1.3920. The residue was cooled and the distillation was continued in vacuo. After excess propionic anhydride was distilled off at 35°–89° C./0.5 mm. in an amount of 92 grams, there was obtained 140 grams (66% yield) of ethyl 2-propionoxymethylene-4-pentenoate which distilled at 89°–97° C./0.5 mm. On redistillation, it boiled at 92°–94° C./0.5 mm. and had an index of refraction, $n_D^{20}$, of 1.4597 and a density, $$d_{20}^{20}$$

of 1.029.

EXAMPLE 8

Ethyl 2-butyroxymethylene-4-pentenoate

A mixture of 156 grams (1.0 mole) of ethyl beta-alloxyacrylate and 237 grams (1.5 moles) of butyric anhydride was heated in a Claisen flask at 179°–202° C. while 94 grams (1.07 moles) of butyric acid which distilled at 135°–154° C. was collected. The residue was cooled and the distillation was continued in vacuo. After removal of 128 grams of butyric anhydride, which distilled at 46°–95° C./0.5 mm., there was obtained 125 grams (52% yield) of ethyl 2-butyroxymethylene-4-pentenoate which distilled at 95°–102° C./0.4 mm. and had an index of refraction, $n_D^{20}$, of 1.4571.

We claim:

1. As a new chemical substance, a compound of the formula

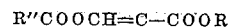
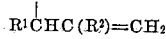

wherein R is a non-tertiary aliphatic hydrocarbon group of not over eight carbon atoms, $R^1$ is a member of the class consisting of hydrogen, the methyl group, and the phenyl group, $R^2$ is a member of the class consisting of hydrogen, chlorine, and the methyl group, at least one of the groups $R^1$ and $R^2$ being hydrogen, and $R''$ is an alkyl group of not over three carbon atoms.

2. As a new chemical substance, a compound of the formula $$CH_3COOCH=C-COOC_2H_5$$
$$|$$
$$CH_2$$
$$|$$
$$CH$$
$$\|$$
$$CH_2$$

3. As a new chemical substance, a compound of the formula $$C_3H_7COOCH=C-COOC_2H_5$$
$$|$$
$$CH_2$$
$$|$$
$$CH$$
$$\|$$
$$CH_2$$

4. As a new chemical substance, a compound of the formula $$C_2H_5COOCH=C-COOC_2H_5$$
$$|$$
$$CH_2$$
$$|$$
$$CH$$
$$\|$$
$$CH_2$$

5. A process for preparing 2-acyloxymethylene-4-pentenoates which comprises reacting together with heating up to 200° C. to complete the reaction an aliphatic monocarboxylic acid anhydride of not over four carbon atoms and an ester $$H_2C=C(R^2)CH(R^1)-C-COOR$$
$$\|$$
$$HOCH$$

wherein R is a non-tertiary aliphatic hydrocarbon group of not over eight carbon atoms, $R^1$ is a member of the class consisting of hydrogen, the methyl group, and the phenyl group, and $R^2$ is a member of the class consisting of hydrogen, chlorine, and the methyl group, at least one of the groups $R^1$ and $R^2$ being hydrogen.

6. A process for preparing ethyl 2-acetoxymethylene-4-pentenoate which comprises reacting by mixing together acetic anhydride and ethyl 2-hydroxymethylene-4-pentenoate, heating the reaction mixture up to 125° C. to complete the reaction, and separating ethyl 2-acetoxymethylene-4-pentenoate.

WILLARD J. CROXALL.
JOHN O. VAN HOOK.

No references cited.